United States Patent Office 3,437,329
Patented Apr. 8, 1969

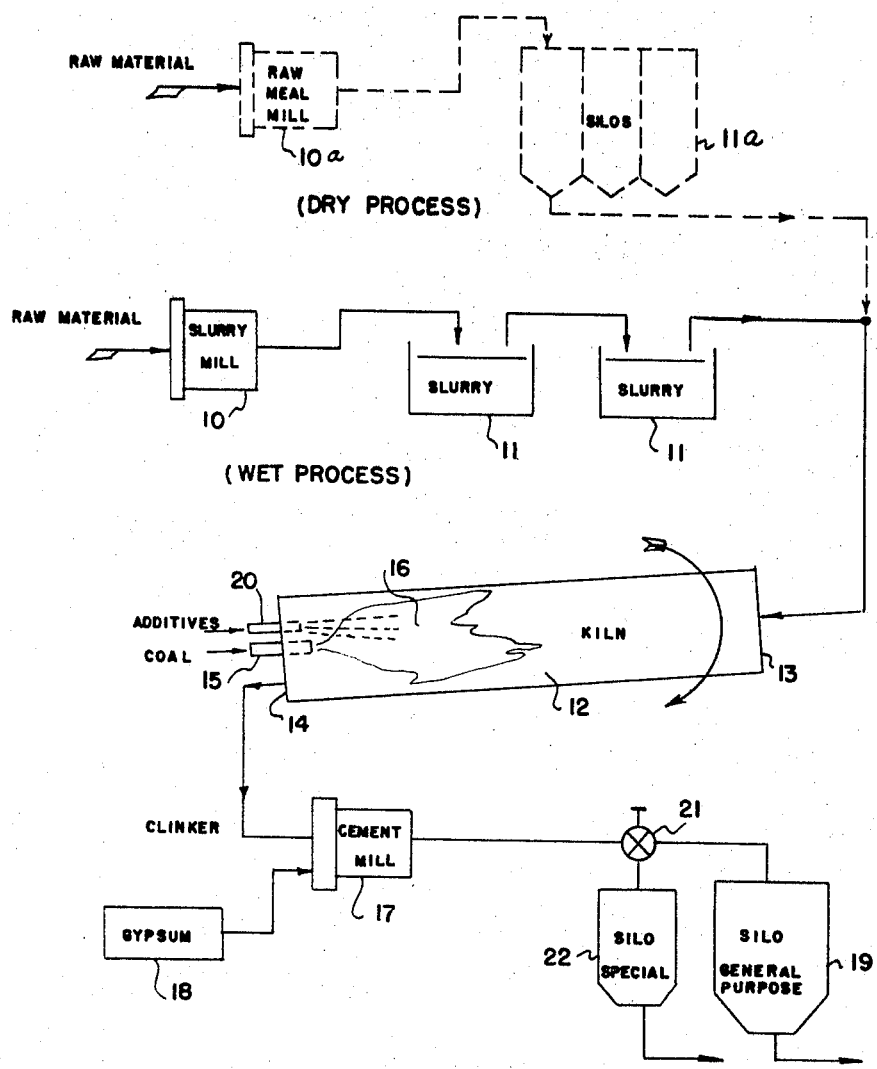

3,437,329
PROCESS FOR FORMING SPECIAL CEMENTS
Werner Ostberg and Terry Patzias, Ann Arbor, Mich., assignors to Dundee Cement Company, Dundee, Mich.
Filed June 23, 1967, Ser. No. 648,464
Int. Cl. C04b 7/44, 1/00
U.S. Cl. 263—53         2 Claims

ABSTRACT OF THE DISCLOSURE

A process for manufacturing special types of portland cement, during operation of a process for forming general purpose portland cement clinker in a cement kiln, utilizing one general purpose slurry or dry, raw meal, by adding to the kiln, and thus mixing and chemically reacting for a predetermined time, a predetermined quantity of at least one of the cement ingredients in pulverized dry form, thereby forming a special cement clinker during that time, while otherwise forming general purpose clinker.

BACKGROUND OF INVENTION

The conventional process for manufacturing portland cement generally comprises mixing predetermined proportions of calcareous and argillaceous materials, which mixture is continuously fed into and burned within a cement forming kiln to form clinker. Such clinker is mixed and pulverized with gypsum to form dry, powdered cement. The original mixing may be with water to form a slurry, or it may be dry to form a dry, raw meal.

The calcareous material may consist of limestone, marl, chalk, oyster shells and the like. The argillaceous materials may consist of clay, shale, slate, slag, fly-ash and the like. The proportions of these ingredients in the mixture, determines the resultant chemical composition of the clinker and the finished cement.

Basically, there are five recognized major types of portland cement. The compositions of these cements are fixed by recognized, commonly used standards set by the American Society of Testing Materials.

The most commonly manufactured cement is that known as Type I, "General Purpose Cement." The remaining four types, used in lesser quantities, are commonly referred to as "Special Purpose Cements," Types II–V, which differ from the General Purpose Cement essentially in the proportions of each ingredient.

Cement manufacturing facilities primarily produce the more widely used Type I, General Purpose Cement. Where there are sufficient orders, and also available kiln equipment, some facilities continuously operate one or more kilns to produce a required type of Special Purpose Cement. Usually this involves the use of a relatively small size kiln. However, the more general practice is to interrupt production of a General Purpose Cement in the available large size kiln, to produce a required amount of Special Purpose Cement, thereafter returning to production of General Purpose Cement. This eliminates the need for a separate kiln, particularly of the small size type which is relatively uneconomical in production.

Thus, where a single kiln is used to produce all types of cement, an order for a Special Purpose Cement necessitates changing the proportions of the slurry or the dry, raw meal. This requires emptying and cleaning out at least one of the slurry supply and storage tanks or the raw meal silo used, and then mixing therein a new mixture with the required proportions of clinker ingredients for this Special Purpose Cement to be manufactured. Thereafter, the new mixture is fed into the kiln, and for some period of time, until the kiln operation stabilizes, the clinker formed may not be suitable as General Purpose Cement clinker or as Special Purpose clinker and therefore is set aside and if possible, later used up by blending with the General Purpose clinker. The "swing-over" time from basic General Purpose Cement to a Special Cement in a typical kiln may run as much as one day during which time the production is not usable except as by blending.

Since different proportions of ingredients tend to burn at slightly different temperatures in the kiln, there frequently is an adverse effect upon the clinker coating formed upon the firebrick and upon the firebrick itself, resulting in wear and damage to the kiln and its firebrick. Such damage is particularly prevalent in the so-called burning zone where heat is provided by burning a suitable fuel, such as pulverized coal, oil or gas and the like mixed with air.

In recent years, the size of cement manufacturing equipment has increased substantially so that currently built kilns may be in the order of 500 to 1000 feet in length, with correspondingly larger diameters.

Hence, changing normal operation, that is, production of General Purpose Cement, to producing special cement clinker, has become an unusually long, time consuming and expensive process, particularly when considering the resulting damage to the kiln firebrick and consequent loss of production time. Thus, in many instances, it has become so uneconomical as to be impractical, to produce Special Purpose Cement at all.

SUMMARY OF INVENTION

It is an object of this invention to provide a process for manufacturing Special Purpose Cements, utilizing the same equipment, slurry or raw meal, used in manufacturing General Purpose Cement clinker without the need for changing normal operating procedures and eliminating the need to mix a new slurry or meal for that purpose.

A further object of this invention is to utilize the normal General Purpose Cement clinker manufacturing processes by, in effect, interrupting it for a while by adding one or more dry, pulverized cement ingredients into the burning zone of the kiln, to form therein Special Purpose clinkers, and upon completion of the required production, discontinue such additions, thereby returning the process to the production of General Purpose clinkers and at the same time considerably reduce the time for "swing-over."

Still a further object of this invention is to form Special Cement clinkers in the normal cement process by changing the proportions of ingredients making up such clinkers by means of adding one or more ingredients in a predetermined amount, into the burning zone of the kiln, for chemically reacting with and mixing with the other ingredients, thereby increasing such one or more ingredients while proportionately decreasing the quantity of the remaining ingredients, to thereby form the required Special Purpose clinker composition.

Summarizing, this invention contemplates utilizing the normal, continuous production process for manufacturing General Purpose Cement, and by periodically interrupting such process, by the addition into the burning zone of predetermined quantities of the cement forming ingredients, producing during such time, Special Purpose Cement clinker.

These and other objects and advantages of this invention will become apparent upon reading the following description, of which the attached drawing forms a part.

DRAWING

The figure schematically illustrates the cement forming process herein, with the wet process shown in solid lines and the dry mix process shown in dotted lines.

DETAILED DISCLOSURE

Process for forming General Purpose Cement

The figure schematically illustrates a typical process for manufacturing cement. The dotted line shown illustrates the dry process and the solid line indicates the wet process for producing the raw mixture fed into the kiln. Referring first to the wet process, the calcareous and argillaceous materials are ground in a ball mill 10, referred to as a slurry mill, which materials with water form slurry conveyed and stored within large slurry storage tanks 11, which are agitated to maintain the mixture substantially uniform. The slurry is then continuously fed to a kiln 12. In the dry process, the raw material, in the form of the calcareous and argillanceous materials are ground in the raw meal mill, ball mill 10a, after which the dry raw meal is conveyed and stored in silos 11a. From the silos the dry, raw material is continuously fed to the kiln 12. Either one or both of the dry and wet processes are conventionally used to supply the raw mixture to the kiln 12.

The kiln is conventionally formed in a tubular shape, out of steel plates, lined internally with fire-brick. It may be of considerable length, such as several hundred feet up to as much as 1000 feet. The kiln is mounted in such a way that it may be rotated about its axis and, for this purpose, suitable drive mechanism is provided (not shown), this all being conventional.

The raw mixture (slurry or dry, raw meal) is fed into the open entrance end 13 of the kiln, and moves towards the discharge end 14 due to the rotation of the kiln, and also due to the kiln being arranged at a slight angle relative to the horizontal. At the discharge end of the kiln, a suitable pipe 15 is provided for blowing a fuel-air mixture into the kiln, utilizing conventional blower equipment (not shown) to form a flame 16 which defines the burning zone of the kiln. The fuel conventionally is in the form of pulverized coal or oil or gas or the like and produces a temperature in the burning zone in the approximate range of 2600 degrees to 2700 degrees F.

During the burning, the water of this slurry is evaporated where the wet process is used, and the mixture chemically reacts and fuses into so-called clinker which is continuously discharged from the discharge end of the kiln 15 and ultimately conveyed to a suitable mill 17 where the clinker is mixed with a predetermined amount of gypsum and is pulverized, with the resultant fine powder conveyed to a general purpose cement silo 19 or to other suitable storage means, from which the cement is removed as needed.

Examples of the formulations of General Purpose Cement slurry mixtures, clinkers and finished cement are given below. The ingredients and figures given are illustrative of typical conditions, and do not represent specific limitations.

*Slurry mixture—Type I—General Purpose Cement*

| | Percent |
|---|---|
| Limestone | 73.1 |
| Blue clay | 26.6 |
| Iron oxide | 0.3 |

*General Purpose clinker*

Chemical composition:

| | Percent |
|---|---|
| $SiO_2$ | 22.0 |
| $Al_2O_3$ | 5.5 |
| $Fe_2O_3$ | 2.5 |
| $CaO$ | 66.2 |
| $MgO$ | 3.0 |

Mineralogical potential compound composition:

| | |
|---|---|
| $C_3S$ | 61.7 |
| $C_2S$ | 16.7 |
| $C_3A$ | 10.3 |
| $C_4AF$ | 7.6 |

*General Purpose Cement*

| | Percent |
|---|---|
| $SiO_2$ | 21.5 |
| $Al_2O_3$ | 5.2 |
| $Fe_2O_3$ | 2.4 |
| $CaO$ | 64.5 |
| $MgO$ | 2.7 |
| $SO_3$ | 2.6 |
| Ign. loss | 0.8 |
| $C_3S$ | 53.5 |
| $C_2S$ | 21.4 |
| $C_3A$ | 9.7 |
| $C_4AF$ | 7.3 | where,

| | |
|---|---|
| C | $CaO$ |
| S | $SiO_2$ |
| A | $Al_2O_3$ |
| F | $Fe_2O_3$ |

Process for manufacturing special cements

One special type of cement referred to as Type II, specified by number as ASTM C-150, has a high silica, high iron, and low alumina content. This type of cement is used in places where sulphate salt may be present to deteriorate ordinary general purpose cement. Thus, this type of cement is considered as being relatively sulphate resistant. It is frequently used in the construction of water dams, where moderate heat of hydration is required.

The following formulation represents a typical formulation Type II cement, conforming to ASTM specification C-150 which was produced from the above mentioned slurry mixture for Type I, General Purpose Cement, by adding certain ingredients to the kiln burning zone. The ingredients and figures given are illustrative of typical conditions, and do not represent specific limitations.

*Type II—Special cement*

| | Percent |
|---|---|
| $SiO_2$ | 23.4 |
| $Al_2O_3$ | 4.5 |
| $Fe_2O_3$ | 3.0 |
| $CaO$ | 63.6 |
| $MgO$ | 2.5 |
| $SO_3$ | 2.3 |
| Ign. loss | 0.8 |
| $C_3S$ | 47.6 |
| $C_2S$ | 28.3 |
| $C_3A$ | 6.8 |
| $C_4AF$ | 9.1 |

Another special type of cement, referred to as Type III, considered as a high early strength cement, or quick hardening cement, has a typical formulation as follows:

*Type III—Special cement*

| | Percent |
|---|---|
| $SiO_2$ | 20.1 |
| $Al_2O_3$ | 6.2 |
| $Fe_2O$ | 2.3 |
| $CaO$ | 65.0 |
| $MgO$ | 2.2 |
| $SO_3$ | 3.0 |
| Ign. loss | 1.0 |
| $C_3S$ | 58.5 |
| $C_2S$ | 13.7 |
| $C_3A$ | 12.5 |
| $C_4AF$ | 7.0 |

As can be seen, the components of the above cements are the same, but the proportions are varied. Hence, it has been common in manufacturing Special Purpose Cements, as exemplified by the two given above to empty one of the slurry tanks, where the wet process is used, and to mix a new slurry in the required proportions, thereafter feeding the raw mixture into the kiln to produce the special cement clinker. Likewise, in the dry process, such raw mixture is formed in a silo cleaned out for that purpose if one is not already available.

The invention herein contemplates utilizing the general purpose raw mixture, either wet or dry and the general purpose process, changing it only to the extent of adding a predetermined quantity of one or more of the raw materials, in dry, powdered form, as an additive blown into the flame or burning zone 16 of the kiln. These additives may be mixed with the fuel and blown through the burner pipe inlet 15, or alternatively, blown through a separate inlet 20 as shown. The continuous rotation of the kiln and the swirling flames mix the additives thoroughly with the contents of the kiln and cause the resulting chemical reaction to produce the special purpose clinker.

As contrasted with using a different and separate mixture for special purpose cements, adding the one or more ingredients as additives to the burning zone, results in virtually no damage to the kiln clinker coating and refractory lining.

Further, the clinker formed coating upon the firebrick in the burning zone is virtually not affected by the introduction of additives, nor is there any other significant change in the clinker formation and removal of the clinker from the kiln.

As can be seen, adding one of the cement forming ingredients to the kiln, in effect, increases the proportion of that ingredient while decreasing the relative proportion of the other ingredients. Therefore, by adding one or more of the required ingredients for special cement, the overall percentages of the ingredients are adjusted upwardly and downwardly to result in the desired proportion in the chemical formulation.

For example, to form the illustrated Type II Special Purpose Cement, the addition of iron oxide and sand adjusts the overall proportions of the chemical composition as compared with the General Purpose Cement. Likewise, the addition of lime and alumina will produce the illustrated Type III Special Purpose Cement. Those skilled in the art can easily calculate the required amount of the additives for the illustrated Special Purpose Cements, as well as others of this category, taking into consideration the size of the kiln, quantity of clinker being produced, etc.

During the time that the additives are blown into the kiln, the Special Cement clinker being formed is continuously removed and later processed through the mill 17, to which the gypsum 18 is added, and then is diverted into a silo 22 set aside to receive the Special Purpose Cement. The diversion is indicated schematically by the valve 21 to illustrate the separation of the Special Purpose Cements from the General Purpose Cements.

During the time that this special cement is being formed, as for example, during a one-day period or more, depending upon the size of the batch needed, the process is uninterrupted, except that it is producing special rather than general purpose cement. However, once the required quantity of special purpose cement is obtained, the additive is no longer blown into the kiln and the process returns to producing general purpose cement uninterruptedly.

The "swing-over" time required for the kiln to change from producing general purpose to special purpose clinker is materially shortened by this process such as on the order of up to two hours so that there is little wastage of clinker which is not of the required proportions either for general purpose or for special purpose.

Thus, with this process, it becomes economical to use the general purpose manufacturing facilities for the production of special purpose cements, as required to fill orders, merely by interrupting the general purpose process as described above.

This invention may be further developed within the scope of the following claims. Accordingly, it is desired that the foregoing description be read as being merely illustrative of an operative embodiment of this invention, and not in a strictly limited sense.

Having fully described an operative embodiment of this invention, we now claim:

1. In a process for forming special cements periodically during operation of a normal process for forming general purpose cement utilizing a general purpose raw mixture prepared by mixing, in predetermined amounts, certain ingredients including argillaceous and calcareous materials;

continuously feeding into one end of and burning such mixture into clinker within a cement kiln by supplying a flame caused by blowing a fuel-air mixture into the opposite end of the kiln, thus forming a flame burning zone within said kiln;

continuously removing said clinker from said kiln opposite end and thereafter mixing and pulverizing said clinker with gypsum;

the improvement comprising continuously adding, for a predetermined time, a predetermined quantity of at least one of the ingredients in dry, powdered form, into said kiln burning zone to thereby utilize the flame to mix and chemically react said added ingredients with the burning mixture to form a special cement clinker of different chemical proportions than a general purpose clinker during such predetermined time;

and including mixing and pulverizing said special cement clinkers with a predetermined proportion of gypsum to form special cement, and thereafter placing said special cement in a separate storage area, separated from the general purpose cement, formed during the normal process.

2. In a process for forming special cements periodically during operation of a normal process for forming general purpose cement utilizing a general purpose raw mixture prepared by mixing, in predetermined amounts, certain ingredients including argillaceous and calcareous materials;

continuously feeding into one end of and burning such mixture into clinker within a cement kiln by supplying a flame caused by blowing a fuel-air mixture into the opposite end of the kiln, thus forming a flame burning zone within said kiln;

continuously removing said clinker from said kiln opposite end and thereafter mixing and pulverizing said clinker with gypsum;

the improvement comprising continuously adding, for a predetermined length of time only, a predetermined quantity of at least one, but not all, of the ingredients in dry, powdered form, into said kiln burning zone to thereby utilize the flame to mix and chemically react said added ingredients with the burning mixture to form during such predetermined time only a special cement clinker of the same ingredients as, but of different chemical proportions than a general purpose clinker made during such normal operations, and maintaining such special cement clinker separate from the normally made general purpose clinker, and thereafter separately processing such special cement clinker to form special cement therefrom.

References Cited

UNITED STATES PATENTS

| | | | |
|---|---|---|---|
| 864,068 | 8/1907 | Bjerregaard | 263—53 |
| 3,003,757 | 10/1961 | Mitchell | 263—53 |
| 3,302,938 | 2/1967 | Bendy | 263—53 X |

JOHN J. CAMBY, *Primary Examiner.*